United States Patent [19]

Chambley et al.

[11] 4,142,355
[45] Mar. 6, 1979

[54] SELF-TWIST YARN NODE FIXATION APPARATUS AND METHOD

[75] Inventors: Phillip W. Chambley; Alan H. Norris, both of Rome, Ga.

[73] Assignee: WWG Industries, Inc., Rome, Ga.

[21] Appl. No.: 852,818

[22] Filed: Nov. 18, 1977

[51] Int. Cl.² ........................................ H01B 13/04
[52] U.S. Cl. .......................... 57/293 AT; 57/297; 156/180
[58] Field of Search ............ 57/34 AT, 156; 156/180, 156/272

[56] References Cited

U.S. PATENT DOCUMENTS

| 3,434,275 | 3/1969 | Backer et al. | 57/34 AT |
| 3,600,251 | 8/1971 | Singleton | 156/272 X |
| 3,684,612 | 8/1972 | Pantazis | 156/272 X |
| 3,775,955 | 12/1973 | Shah | 57/34 AT |
| 4,074,511 | 2/1978 | Chambley et al. | 57/34 AT |

*Primary Examiner*—Charles Gorenstein

*Attorney, Agent, or Firm*—Beveridge, DeGrandi, Kline & Lunsford

[57] ABSTRACT

Self-twist plural yarn strands are produced by a system wherein at least two singles yarn strands are individually twisted to form twisted strands each having longitudinally spaced nodes. The strands are separately conveyed around a yarn wheel and brought together in a parallel relationship with the nodes of one strand substantially aligned with the nodes of each other strand. The corresponding nodes from one strand are fastened to those of each other strand by heating with an electric arc and the strands are removed from the wheel and allowed to ply. The node fastening means comprises a pair of electrodes and a circuit for supplying arc-producing voltage across the electrodes. One electrode is mounted on the wheel and extends diagonally across and under the node location. The other electrode is fixed adjacent the wheel so that the arc traverses the yarn as it passes from one end of the diagonal electrode to the other.

3 Claims, 10 Drawing Figures

SELF-TWIST YARN NODE FIXATION APPARATUS AND METHOD

This invention relates to an improved process and apparatus for attaching yarns in bundles to each other, especially yarns of the self-twist type.

BACKGROUND OF THE INVENTION

In the manufacture of yarn, particularly yarn from synthetic fibers, there have been substantial developments in the art of false-twist and self-twist yarns because of various production advantages which can be realized using these techniques, and because such processes provide a shortened manufacturing route to a finished yarn product, and are therefore more economical as compared with conventional spinning and twisting processes.

As used herein, the term "false-twist" refers to a yarn in which a yarn strand is twisted at some intermediate point generating opposite twists on either side of the twist insertion device, with the point at which the device is located containing zero twist, which point will be referred to as a "node." The directions of twist are referred to as "S-twist" or "Z-twist," the appropriate letter being employed for twists in which the helices in twisted strands correspond with the middle portion of the appropriate letter.

The term "self-twist" is applied to yarns wherein two or more false-twisted strands are brought together and permitted to ply themselves. Approximately equal torsional forces of the same direction are stored in each of a pair or more of singles yarns which are later brought into contact. Torque is released, permitting the singles yarns to untwist, and in so doing, wrap around each other, forming a plied yarn.

Generally speaking, false-twisting and self-twisting and the yarns produced thereby have received considerable attention in recent years and reference is made to the following documents in which these yarns, the techniques for producing them, and specific apparatus related thereto are discussed:

"Self-Twist Yarn," D. E. Henshaw, Merrow Publishing Co., Ltd., Watford, Herts, England, 1971.
U.S. Pat. Nos.

Re. 27,717 — Breen et al.
3,225,533 — Henshaw
3,306,023 — Henshaw et al.
3,353,344 — Clendening, Jr.
3,434,275 — Backer et al.
3,507,108 — Yoshimura et al.
3,717,988 — Walls
3,775,955 — Shah
3,940,917 — Strachan While this is by no means an exhaustive listing of patents or literature references on this subject, the foregoing techniques describe part of the prior art.

As will be recognized from these and other references relating to this art, there are a number of problems inherent in producing yarn using self-twist techniques, these problems being related in part to the fact that the yarn tends to be relatively unstable due to the different twists in singles being able to cancel each other through the node area. In this regard, the above-cited U.S. Pat. No. 3,434,275, to Backer et al. suggests joining regions of twist reversal.

An improved apparatus for forming and self-twisting yarns and for joining self-twisted singles yarns at their nodes is disclosed in U.S. Pat. application Ser. No. 755,671, now U.S. Pat. No. 4,074,511, which application is assigned to the same assignee and is hereby incorporated by reference.

BRIEF SUMMARY OF THE INVENTION

An object of the present invention is to provide a unique and improved apparatus for fixing or locking yarn at the node points.

Briefly described, the invention includes, in an apparatus for forming a self-twist plural strand yarn of the type having means for forming two or more singles yarn strands, means for twisting each of said strands individually to form false-twisted strands each having longitudinally spaced nodes at which the direction of twist reverses, and means for guiding the strands into closely spaced substantially parallel paths with the nodes of one strand substantially aligned with the nodes of the other strand, an improved means for fastening together each of the strands at the nodes, comprising means for establishing an electrical arc adjacent the path of travel of the strands and for causing said arc to traverse the strands whereby the strands are heated and joined at the traversal location.

The invention also contemplates placing the nodes together at the arc traversal location so that the strands are joined at the nodes.

The invention also includes a method of joining synthetic yarn strands comprising the steps of placing portions of the yarn strands in juxtaposition so that the fibers thereof are in closely spaced relationship, and passing an ionizing electric discharge arc through the strands and causing the arc to traverse the strands to elevate the temperature thereof above the softening temperature of the fibers.

In order that the manner in which the foregoing and other objects are attained in accordance with the invention can be understood in detail, certain advantageous embodiments thereof will be described with reference to the accompanying drawings, which form a part of this specification and wherein.

Figure 1:
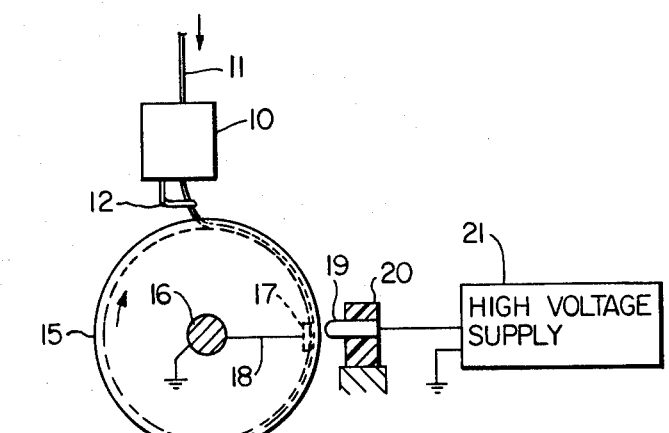
FIG. 1 is a schematic side elevation of an apparatus in accordance with the invention.
Figure 2:
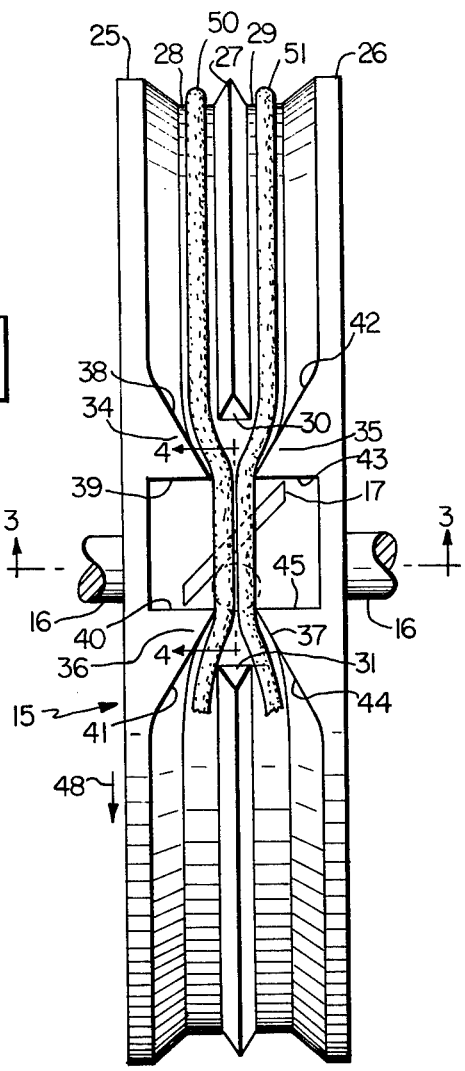
FIG. 2 is an enlarged front elevation of a yarn wheel and node fixing structure usable in the apparatus of FIG. 1.
Figure 4:
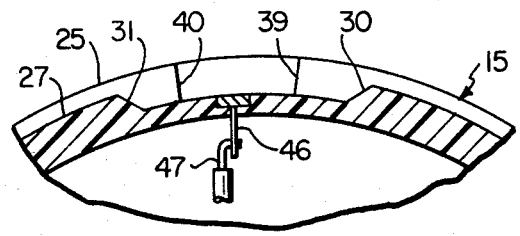
Figure 7:
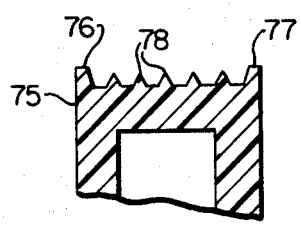
Figure 8:
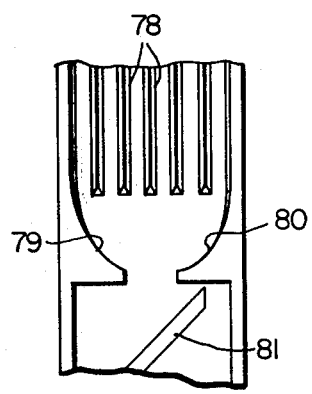
Figure 3:
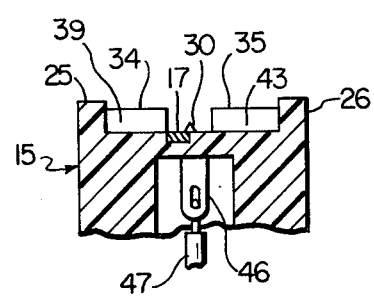
Figure 5A:
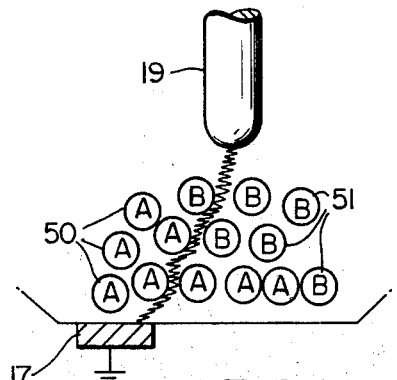
Figure 5B:
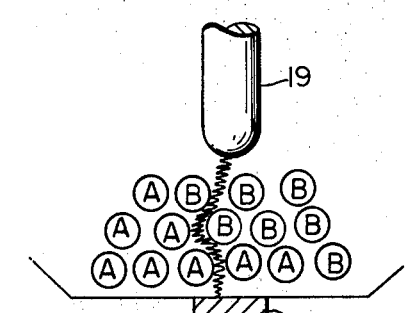
Figure 5C:
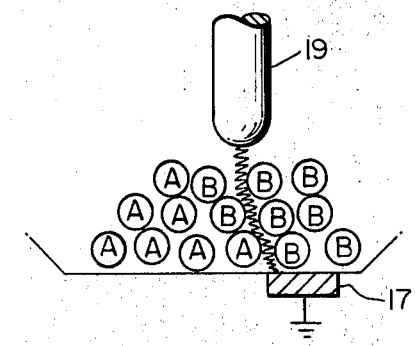
Figure 6:
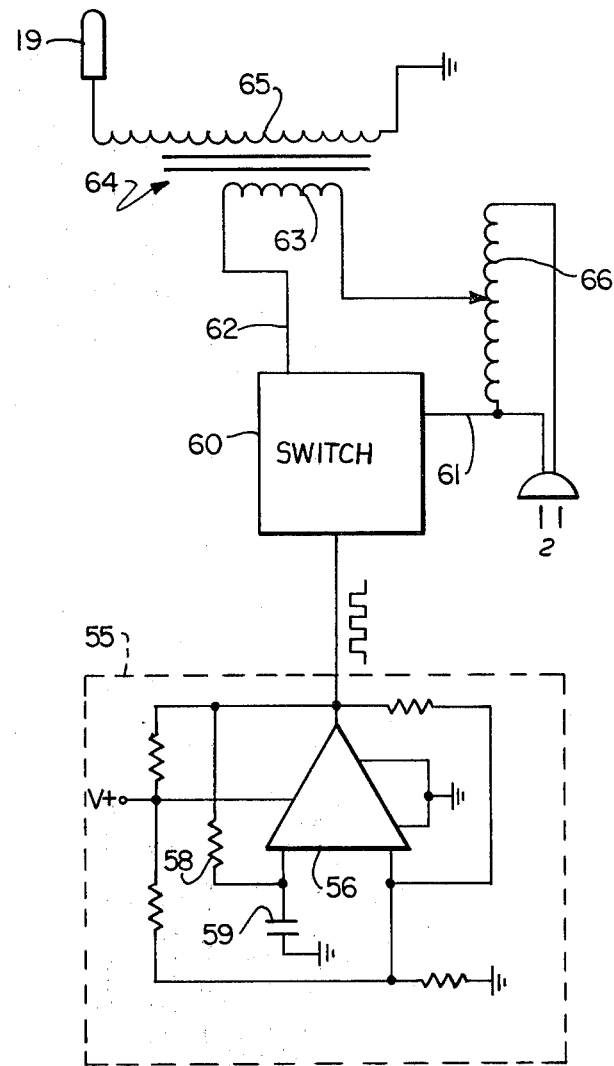

FIGS. 3 and 4 are partial sectional views along lines 3—3 and 4—4, respectively, of FIG. 2;

FIGS. 5A–C are schematic sequential illustrations of the operation of the apparatus of FIGS. 1–4;

FIG. 6 is a schematic diagram, partly in block form, of a circuit usable in the apparatus of FIG. 1; and FIGS. 7 and 8 are partial sectional front and side elevations, respectively, of a further embodiment of a yarn wheel usable in the apparatus of FIG. 1.

The terms "node fixation" and "node fastening" are interchangeably used herein to mean a process for subjecting two or more adjacent singles node areas to an electrical discharge, referred to herein as an arc, so as to elevate the temperature of fibers in nodes of each of the yarns above a point at which the fibers can adhere to each other, thereby "fixing" or "locking" and nodes, and thus preventing rotation of the singles yarns. Such node fixation permanently preserves the singles twist, since the singles twists which are in opposite directions on either side of the nodes cannot "see" or "reach" each other and cancel through the fastened node.

In order to describe the present invention in a meaningful context, the general system disclosed in U.S. Pat. No. 4,074,511 will first be briefly described.

As shown therein, the system of yarn formation commences with the yarn strands being withdrawn from sliver containers, the yarn strands being subjected to a drafting or drawing process by pulling the yarns between sets of drafting rolls. The downstream roll in each set typically is driven at a surface velocity greater than its associated upstream roll. The yarns can then be passed through primary twist jets which operate to impart and maintain twist at the critical point where the otherwise flat sliver ribbon leaves the draft delivery rolls. The yarn strands are then passed through singles-twist jets wherein the twist is inserted in the yarn strands. Air under pressure is supplied to the twist jets through conduits to alternately twist the strands in S and Z directions. It should be noted at this stage that the false-twist jets are paired to twist the yarn strands in the same direction as each other and are operated to periodically reverse the direction of twist to result in a yarn wherein there are opposite senses of twist separated by short nodes of zero twist, which nodes are in synchronization with the yarn wheel which bears the fixation device, so that the nodes appear at the fixation device. Thus, the yarn strands emerge from the jets with alternating S and Z portions of twist therein.

Turning now to the drawings in the present application, a twist jet 10 is illustrated, although it will be understood that this is a schematic representation only and that at least two such jets are provided. Yarn strands 11 passing therethrough are twisted as previously described. The strands are passed through generally elongated wire guides 12 which assist in maintaining the singles twist in the yarn strands and serve the purpose of bringing the yarns into a relatively closely spaced relationship, but not in contact with each other. The yarns are guided onto a yarn wheel indicated generally at 15, the details of which will be described hereinafter. Yarn wheel 15 serves the function of guiding the yarns in parallel spaced relationship with each other and fixing the yarns at their nodes.

As previously suggested, yarns which are twisted, brought together and allowed to ply immediately upon leaving the singles yarn twist-insertion apparatus exhibit non-uniform twist distribution in the plied yarn. Generally, the twist is tighter just after the twist direction change, i.e., the node, and then begins to decrease with increased distance from the node. In some cases, a distinct loss of twist has been observed just prior to the direction change node.

The tight twist presence following the node can be attributed to feed-through of backed up twist from behind the insertion device when the twist direction change occurs. Because the ply twist is the result of the release of forces stored in the singles twist, the twist non-uniformly in the plied yarn is apparently caused by non-uniformity of the singles twist. This is partly the result of twisting the singles yarn in one direction, generating, for example, a Z twist above the jet and an S jet twist below the jet, and then reversing the direction of the jet so that, at the instant of the switch from Z to S ply mode, the jet permits the leading end of the upstream Z singles twist to pass through to a position below the jet. After reversal, the jet further inserts Z twist below the jet in a portion of the yarn which already has some Z twist, thereby causing that portion adjacent the node to be more tightly twisted than the following yarn.

This is also true when the twist is in the opposite direction.

Clearly, there are differences is stored torque along the length of twist between the nodes. The yarn cross-sectional areas (fibers per cross section) are equal or nearly equal. Since one portion is twisted tighter than the other portions, it has greater stored torque and therefore a greater tendency to untwist than the other portions.

If, however, two longitudinally adjacent nodes are held in a fixed position in a single yarn and the yarn in between is not confined or restrained, the non-uniform twist will distribute itself along that length, the result being a more equal distribution of twist between nodes. By locking the yarn at the nodes to an adjacent yarn prior to permitting the self-twist or plying to occur, it is possible to accomplish the equivalent of holding the nodes while guiding a portion of the yarn around the yarn wheel but keeping the singles yarns apart, thereby permitting this distribution to occur before two adjacent singles yarns are allowed to ply together. Such method produces yarn of a much greater uniformity of twist along the distance spanning two adjacent longitudinal nodes than is possible by a process which provides no means for holding singles yarns separate to allow such "leveling" of singles twist to occur, e.g., by locking the nodes after the ply twist has developed. Because the two strands of yarn do not ply until they leave the wheel surface, the singles yarns are able to self-adjust any variations in torque between nodes by slippage on the wheel surface in the direction of rotation about their own axes, thereby equalizing the twist distribution.

It will be observed that yarn twist cannot be equalized after plying because each cross section in a self-twist yarn has reached a torque balance between the ply and singles twist. Once this balance occurs, no further axial rotation can occur.

The yarn wheel is provided with a fixation means to effect locking of the nodes and the wheel is driven by a drive and control device, not shown, by axle 16 in synchronism with the delivery speed of the yarn and the control apparatus controlling jets so that the nodes are contacted by the fixation means on the yarn wheel.

Axle 16 is electrically conductive and is electrically connected to ground. Along the surface of the yarn wheel is at least one electrically conductive electrode plate 17 which is connected to axle 16 and by a wire 18 and is therefore grounded. Plate 17 is a part of the wheel 15 and rotates therewith.

Adjacent to, but spaced from, the surface of wheel 15 is a second electrode 19 which can be supported by an insulating support member 20 in a fixed location. Electrode 19 is connected to the high voltage output terminal of a supply circuit 21, the other output terminal of which is also grounded.

As will be recognized, if the spacing between electrodes 17 and 19 and the voltage applied between those electrodes are properly selected, when wheel 15 rotates to the position at which electrode 17 is closest to electrode 19, an electrical discharge will occur between the electrodes, ionizing the air therebetween and generating substantial heat. The yarn strands in the discharge area will then also be heated, softened and caused to stick together. Thus, the strands will be joined, as desired.

It will be recognized that the circumference of the yarn wheel can be chosen to be equal to the spacing S between nodes, as determined by the control devices controlling the twist jets, so that as a new node is placed on the surface of the wheel 15, it lies in the proper location to be adjacent electrode 17. Alternatively, the wheel circumference can be an integral multiple N of node spacing, i.e., NS, and the surface of the wheel can then be provided with N grounded electrodes 17, circularly spaced at equal intervals. However, the apparatus will be described with only one such electrode.

After joining, the plied yarn is guided away from the yarn wheel and wound or taken up by other appropriate means, or may be first passed through the continuous heat-setting apparatus.

A yarn wheel including guide means and node fixation means in accordance with the invention is shown in greater detail in FIGS. 2-4. As shown therein, the wheel is a generally disc-shaped member having flanges 25 and 26 at the axial limits thereof and a central, separatory flange 27, the three flanges defining peripheral surface portions 28 and 29 along which yarn strands can be separately guided. Although wheel 15 is shown as having a single central, separatory flange 27, additional separatory flanges may be provided depending on the number of single yarns being plied. The number of separatory flanges will always be one less than the number of singles yarns being plied. Central flange 27 is interrupted at ends 30 and 31 to permit the strands to be brought together.

The fixation apparatus lies in the arcuate portion of the yarn wheel generally between ends 30 and 31, and includes a diagonally extending electrode 17 which lies in a surface portion of the yarn wheel which is on the same radius of the wheel as surfaces 28 and 29. As illustrated in FIGS. 3 and 4, the yarn wheel itself is made from electrically nonconductive material, such as molded plastic, and the electrode 17 which is, of course, electrically conductive, can be embedded in the surface of the plastic so that the exposed surface thereof is at about the same level as the surrounding plastic portions. As indicated in FIG. 2, the electrode extends transversely of the yarn, and also longitudinally relative thereto, being, in the embodiment illustrated, at an angle of about 45° relative to a plane passing through the disc and perpendicular to the axis thereof.

In order to bring the yarns strands together at electrode 17, flanges 25 and 26 can be formed with inwardly extending guide members 34, 35, 36 and 37, each of these guide members having an inwardly extending inclined surface which smoothly mates with the inwardly facing portions of the outer flanges. Thus, considering the guide portions as observed extending downwardly from the upper end of the illustration in FIG. 2, the inwardly facing guide surface 38 extends diagonally inwardly toward the plane containing central flange 27 and terminates at a point immediately above the upper extent of electrode 17, at which point the guide member terminates in a transverse wall 39, defining one extreme of a generally rectangular cavity containing electrode 17. Similarly, guide portion 36 has a transverse wall 40 and an outwardly flaring guide surface 41 which faces flange 27. Guide portion 35 has an inwardly facing guide surface 42 and a downwardly facing transverse wall 43, and guide member 37 has an inwardly facing guide surface 44 and a transverse wall portion 45. While each of these members is shown being integrally formed with the flanges and the remainder of the wheel structure, they can, of course, be replaced by generally triangular insert members, separately formed.

As seen in FIGS. 3 and 4, electrode 17 is integrally formed with, or fixedly attached to, a conductive terminal 46 which extends through the peripheral wall of wheel 15 and is connected to a wire 47 which is attached to axle 16 to ground electrode 17. For this purpose, it is convenient to form the yarn wheel as a hollow body.

In order to illustrate the manner of use, FIG. 2 is shown with yarn strands 50 and 51 which lie in the paths defined by the flanges of wheel 15 and which are separated by flange 27. Then, at the location of electrode 17, the yarns are moved axially toward each other in the interval between end portions 30 and 31 of flange 27, so that they extend across electrode 17. It will also be observed that the ends of electrode 17 protrude beyond the yarn, thus providing end surfaces exposed to electrode 19 so that an arc can initially be struck without interference from the yarns themselves. As will be recognized, with the visible surface of wheel 15 rotating in the direction indicated by arrow 48, the portion of electrode 17 adjacent wall 40 will approach electrode 19 first, and an arc will be struck between the two electrodes. Then, as the wheel continues to rotate, the arc will travel along electrode 17 as portions of that electrode approach electrode 19. The arc will then travel from one end of electrodes 17 to the other, traversing the yarns as it moves.

This is more clearly illustrated in the sequential, and rather schematic, illustrations of FIGS. 5A-5C. As shown in those figures, electrode 17 is illustrated as a grounded rectangle sequentially occupying three different transverse positions relative to electrode 19. It will be recognized from FIGS. 2-4 that electrode 17 does not actually move, but that the effective region thereof traverses the portion of the yarns to be locked giving the effective result of moving electrode 17 across beneath the yarn bundle.

The yarn strands themselves are illustrated as a plurality of fibers, one group of the fibers being illustrated as circles with the letter A representing the fibers in yarn strand 50, and another group being illustrated as circles with the letter B illustrating the fibers of strand 51. Since the fibers at the joining location are at a region of twist reversal, they are substantially aligned with each other and are also under tension. With the combined action of the tension and the inward pressure exerted by guide members 34-37, the fibers are compacted into a relatively closedly spaced bundle, but with air spaces extending therebetween. Generally speaking, the fibers are electrically nonconductive because the bundle itself is permeable and the air in the interstices between the fibers becomes ionized, permitting the arc to travel between electrodes and between the fibers in the node. Heat from the electric arc causes the thermoplastic fibers to soften and stick together. Since the node is comprised of fibers from both singles yarns, the node is effectively locked to prevent slippage and loss of ply and singles twist.

With the technique, it is possible to develop rather extreme temperatures in the arc path, well in excess of the sticking temperature of known thermoplastics. Thus, it is desirable to provide close control of the exposure time. i.e., the time during which the node region is subjected to arcing, in order to avoid excessive heat and consequent destruction of the node by completely melting the fiber bundle. A suitable circuit for accomplishing this, and for supplying the high voltage to electrode 19, is illustrated in FIG. 6. As shown therein, a conventional solid-state multivibrator circuit 55, including an operational amplifier 56, produces a series of square wave pulses, the repetition rate of which can be selected by suitable choice of values of feedback resistor 58 and capacitor 59 in the multivibrator circuit, this being a well understood technique. The output of circuit 55 is delivered to a switch 60 to alternately open and close a circuit through the switch. The circuit within switch 60 to be completed is between conductors 61 and 62, conductor 61 being connected to one side of an AC source of supply and conductor 62 being connected to one terminal of the primary winding 63 of a step-up transformer indicated generally at 64. One end of the secondary winding 65 of transformer 64 is connected to probe 19 and the other end thereof is connected to ground.

Conductor 61 is also connected to one end of a conventional variable autotransformer 66, the other end of which is connected to the other side of the AC supply. The variable output tap of autotransformer 66 is connected to the other terminal of primary winding 63.

Switch 60 can be a relay such as, for example, a reed relay. Alternatively, the switch can be a solid-state device such as a silicon controlled rectifier (SCR) or a TRIAC with the gate of the semi-conductor device being connected to the output of multivibrator 55 and the conductive path thereof being connected between conductors 61 and 62.

The frequency of the pulses in the node area can be adjusted to a rate which permits "spot welding" of the filaments in the node to each other but avoids excessive yarn melting due to heat from long duration arcing in a small area. The frequency adjustment capability can also facilitate processing yarn over a wide range of speeds passing through the apparatus illustrated in FIG. 1. It will also be recognized that the variability of autotransformer 66 permits adjustment of the voltage to a suitable level. Voltages supplied to electrode 19 are typically in the order to 3 kilovolts or more of alternating current. While direct current can also be used, the voltage level thereof would necessarily be higher for the same spacing between electrodes 17 and 19. A transformer suitable for transformer 64 is a 7.5 kilovolt neon sign transformer, this rating indicating that with a primary voltage of 115 volts, the secondary output voltage is about 7.5 kv. As will be recognized, the autotransformer permits a lower or higher input voltage to be used, thereby providing a decreased or increased output voltage.

Electrode 19 can be formed with a pointed end to promote arcing, but a rounded end is preferred to avoid deformation thereof over a period of time.

It should also be noted that, for purposes of safety and reduction of ratio interference, it is desirable to encase the probe and high voltage wiring in a grounded conductive enclosure.

FIGS. 7 and 8 illustrate a further embodiment of a yarn wheel in accordance with the invention wherein multiple yarns, more than two in number, can be joined. As shown therein, the yarn wheel 75 is provided with side flanges 76 and 77 and a plurality of separatory flanges 78 to maintain the yarns in spaced relationship until they leave the yarn wheel. Separatory flanges 78 are interrupted to provide a fixation zone in which guide portions 79 and 80 cause the yarns to come together and lie across a diagonally disposed electrode 81 which can cooperate with an electrode substantially identical to electrode 19 for fixation. It will further be recognized that electrode 19 can be made in a wider form, If necessary, to guarantee formation of an arc if the yarn bundle including several strands has a greater transverse dimension. The operation of the embodiment of FIGS. 7 and 8 is the same as that previously described.

While certain advantageous embodiments have been chosen to illustrate the invention, it will be understood by those skilled in the art that various changes and modifications can be made therein without departing from the scope of the invention as defined in the appended claims.

What is claimed is:

1. A method of locking the nodes of self-twist yarn comprising individually false-twisting a plurality of yarn strands so that the strands have longitudinally separated regions of alternating twist separated by twist reversal nodes, guiding the strands so that portions thereof travel along a path in parallel relationship with adjacent twisted regions thereof having the same direction of twist and with the nodes in substantial longitudinal alignment, providing a first electrode adjacent and on one side of the aligned nodes, said first electrode being moved with said aligned nodes, bringing adjacent aligned nodes into contact with each other, providing a second electrode on the other side of the aligned nodes, said second electrode being in a fixed location adjacent the travel path through which the nodes and the first electrode move, connecting a source of voltage to the two electrodes to establish an electrical discharge arc therebetween, maintaining the discharge arc for a sufficient time to heat and soften the strands at the nodes, thereby locking the nodes together, and permitting the strands to self-twist.

2. A method according to claim 1 wherein the first electrode is elongated and extends diagonally relative to the path of travel whereby the arc moves in the direction of elongation of the first electrode and across the nodes as the first electrode and the strands pass the second electrode.

3. In an apparatus for forming a self-twist plural strand yarn of the type having means for forming a plurality of singles yarn strands, means for twisting each of said strands individually to form false-twisted strands each having longitudinally spaced nodes of twist reversal, and means for guiding the strands into closely spaced substantially parallel paths with the nodes of one strand substantially aligned with the nodes of each other strand, an improved means for fastening together each of the strands at the nodes comprising means for establishing an electrical arc adjacent the path of travel of said strands and for causing said arc to traverse the nodes thereof whereby the nodes are heated and joined at the traversal location, wherein said means for establishing an arc includes a source of high voltage; a first elongated electrode mounted diagonally across said path of travel, said first electrode being movable with said strands; a second electrode fixedly mounted adjacent said path of travel; and means for electrically connecting said first and second electrodes to said source of voltage.

* * * * *